(12) United States Patent
Wisherd et al.

(10) Patent No.: US 8,826,561 B2
(45) Date of Patent: Sep. 9, 2014

(54) HIGH EFFICIENCY HEAT GENERATOR

(75) Inventors: David S. Wisherd, Carmel, CA (US);
John A. Eisenberg, Los Altos, CA (US);
Pablo E. D'Anna, Redding, CA (US)

(73) Assignee: Cool Dry LLC, San Jose, CA (US)

( * ) Notice: Subject to any disclaimer, the term of this patent is extended or adjusted under 35 U.S.C. 154(b) by 778 days.

(21) Appl. No.: 12/803,089

(22) Filed: Jun. 17, 2010

(65) Prior Publication Data
US 2011/0308101 A1   Dec. 22, 2011

(51) Int. Cl.
| | |
|---|---|
| *F26B 3/34* | (2006.01) |
| *D06F 58/26* | (2006.01) |
| *F26B 3/347* | (2006.01) |
| *F26B 11/04* | (2006.01) |
| *D06F 58/28* | (2006.01) |

(52) U.S. Cl.
CPC ......... *F26B 3/347* (2013.01); *D06F 2058/289* (2013.01); *D06F 58/26* (2013.01); *D06F 58/28* (2013.01); *D06F 2058/2816* (2013.01); *F26B 11/04* (2013.01); *D06F 2058/2896* (2013.01)
USPC .............................. 34/255; 34/261

(58) Field of Classification Search
USPC ................. 34/255, 258–261, 88, 89, 246
See application file for complete search history.

(56) References Cited

U.S. PATENT DOCUMENTS

| | | | |
|---|---|---|---|
| 2,472,193 A | 6/1949 | Clayton | |
| 2,511,839 A | 6/1950 | Frye | |
| 3,866,255 A | 2/1975 | Serota | |
| 3,938,260 A | 2/1976 | Brenner et al. | |
| 4,126,563 A | 11/1978 | Barker | |
| 4,250,628 A | 2/1981 | Smith et al. | |
| 5,463,821 A | 11/1995 | Gauer | |
| 5,712,469 A | 1/1998 | Chaffin et al. | |
| 5,869,817 A | 2/1999 | Zietlow et al. | |
| 5,983,520 A | 11/1999 | Kim et al. | |
| 6,124,624 A | 9/2000 | Van Roosmalen et al. | |
| 6,141,634 A | 10/2000 | Flint et al. | |
| 6,344,638 B1 | 2/2002 | Tomasello | |
| 6,417,499 B2 | 7/2002 | Blaker et al. | |

(Continued)

FOREIGN PATENT DOCUMENTS

GB          835454 A      5/1960

OTHER PUBLICATIONS

Wilson et al., Radio-Frequency Dielectric Heating in Industry, Thermo Energy Corporation, Report [online], Mar. 1987. Retrieved from Internet: <URL: http://infohouse.p2ric.org/ref/39/38699.pdf.
U.S. Appl. No. 12/957,401: Office Action dated Oct. 25, 2013.

(Continued)

*Primary Examiner* — Kenneth Rinehart
*Assistant Examiner* — John McCormack
(74) *Attorney, Agent, or Firm* — Edward J. Radlo; Radlo IP Law Group

(57) ABSTRACT

A method for heating a medium that includes an object having a variable weight is provided. The method comprises (A) placing medium including an object having variable weight into a variable enclosure having adjustable dimensions; (B) initiating a heating process by subjecting the medium including the object to a variable AC electrical field; (C) substantially continuously measuring an impedance of medium including the object during the heating process; (D) adjusting dimensions of said variable enclosure to optimize the heating process; (E) adjusting parameters of the variable AC electrical field to optimize the heating process; and (F) controlling the heating process.

18 Claims, 7 Drawing Sheets

(56) References Cited

U.S. PATENT DOCUMENTS

| | | | |
|---|---|---|---|
| 6,423,955 | B1 | 7/2002 | Blaker et al. |
| 6,657,173 | B2 | 12/2003 | Flugstad et al. |
| 6,825,618 | B2 * | 11/2004 | Pu et al. .................. 315/111.51 |
| 6,914,226 | B2 | 7/2005 | Ottaway |
| 6,971,189 | B1 * | 12/2005 | Anibas ............................ 34/602 |
| 7,034,266 | B1 * | 4/2006 | DeGroot et al. ............. 219/700 |
| 7,325,330 | B2 * | 2/2008 | Kim et al. ....................... 34/407 |
| 7,380,423 | B1 | 6/2008 | Musone |
| 7,933,733 | B2 | 4/2011 | Ashrafzadeh et al. |
| 8,035,255 | B2 | 10/2011 | Kurs et al. |
| 8,058,588 | B2 | 11/2011 | Gagas et al. |
| 8,215,133 | B2 | 7/2012 | Kim et al. |
| 2004/0031731 | A1 * | 2/2004 | Honeycutt et al. ............ 208/402 |
| 2006/0109327 | A1 | 5/2006 | Diamond et al. |
| 2007/0045307 | A1 | 3/2007 | Tsui et al. |
| 2007/0271814 | A1 | 11/2007 | Bae et al. |
| 2009/0236334 | A1 | 9/2009 | Ben-Shmuel et al. |
| 2010/0115785 | A1 * | 5/2010 | Ben-Shmuel et al. .......... 34/260 |
| 2011/0067186 | A1 | 3/2011 | Johansson |
| 2012/0096737 | A1 * | 4/2012 | Kmet et al. ..................... 34/443 |

OTHER PUBLICATIONS

Written Opinion of the International Searching Authority (ISA/US) mailed Sep. 15, 2011 for international patent application PCT/US2011/038594 filed May 31, 2011, 15 pages.

International Search Report (ISA/US) mailed Aug. 3, 2012 for international patent application PCT/US2012/033900 filed Apr. 17, 2012, 4 pages, Written Opinion of the International Searching Authority (ISA/US) mailed Aug. 3, 2012 for international patent application PCT/US2012/033900 filed Apr. 17, 2012, 6 pages.

International Search Report (ISA/US) mailed Jan. 25, 2013 for international patent application PCT/US2012/061738 filed Oct. 24, 2012, 3 pages.

Written Opinion of the International Searching Authority (ISA/US) mailed Jan. 25, 2013 for international patent application PCT/US2012/061736 filed Oct. 24, 2012, 5 pages.

Specification sheet for 1 KW Class E Module PRF-1150 power module © 2002, Directed Energy, Inc., downloaded on Mar. 17, 2014 from: http://ixys.com/SearchResults.aspx?search=class+E&SearchSubmit=Go, 17 pages.

* cited by examiner

HIGH EFFICIENCY HEAT GENERATOR

TECHNICAL FIELD

The technology relates to the field of Radio Frequency (RF) heating systems.

BACKGROUND

Conventional clothes dryers heat a large volume of air that then passes over tumbling clothes. Water is extracted from the wet clothes by evaporation into the heated air. This conventional drying process is extremely inefficient, as at least 85% of the energy consumed by the machine goes out the vent.

The stated above inefficiency of conventional drying process is due to the fact that air is a very poor heat conductor. Thus, for example, only very small engines can be air cooled efficiently. On the other hand, some large engines, for example, an automobile engine, or a high power motorcycle engine, use water cooling because water is much better heat conductor than air.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method for heating a medium that includes an object having a variable weight is provided. The method comprises: (A) placing the medium including an object having a variable weight into a variable enclosure having adjustable dimensions; (B) initiating a heating process by subjecting the medium including the object having a variable weight to a variable AC electrical field; wherein the object substantially absorbs the medium in a first "cool" state; and wherein the object is substantially free from the medium in a second "heated" state.

The method further comprises: (C) substantially continuously measuring an impedance of the medium including the object having a variable weight during the heating process; (D) adjusting dimensions of the variable enclosure to optimize the heating process; (E) adjusting the parameters of the variable AC electrical field to optimize the heating process; and (F) controlling the heating process, wherein the heating process is completed when the object is substantially transferred into the second "heated" state.

In an embodiment of the present technology, an apparatus for drying a load of clothing uses a dryer drum having an anode plate configured to dry efficiently a load of clothing by directing the applied RF energy to water and use an air flow to remove the evaporated water.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

I. Apparatus for Efficient Drying a Load of Clothing.

Figure 1:
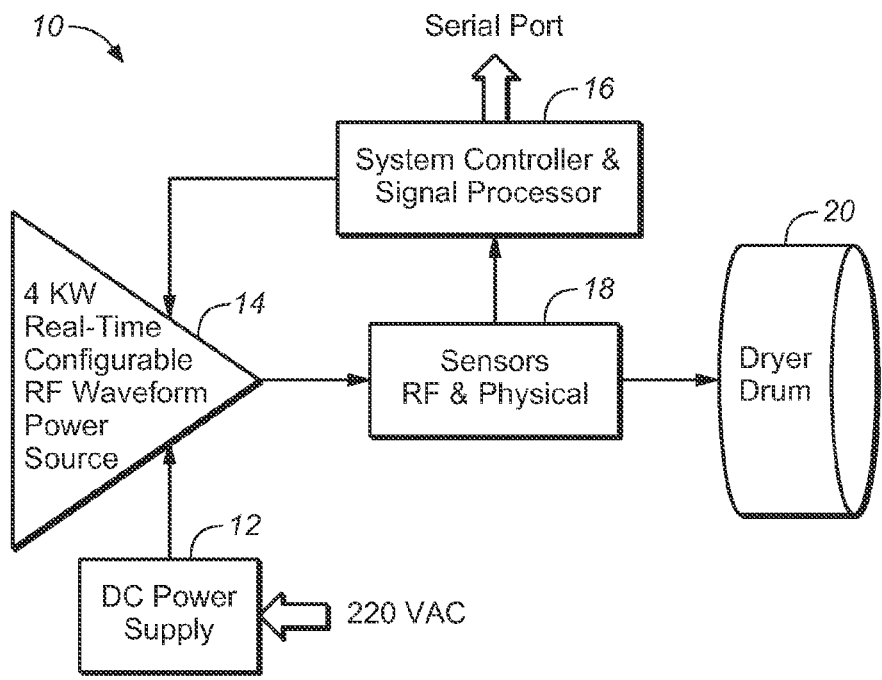
FIG. 1 illustrates an apparatus of the present technology for efficient drying a load of clothing.

In an embodiment of the present technology, FIG. 1 depicts the apparatus 10 for efficient drying a load of clothing comprising a DC power supply 12, a real time configurable RF Waveform power source 14, a system controller & signal processor 16, a plurality of RF & Physical sensors 18, and a dryer drum 20. As it is disclosed below, in an embodiment of the present technology, the apparatus 10 is used to directly heat water in the laundry load by RF energy.

In one embodiment of the present technology, the level of the RF source DC supply voltage (12 of FIG. 1) is adjusted for optimum power transfer to varying real components of the load impedance. The adjustment of the level of the RF source DC supply voltage (12 of FIG. 1) optimizes the energy transfer efficiency and heating speed. Please, see discussion below.

Figure 2:
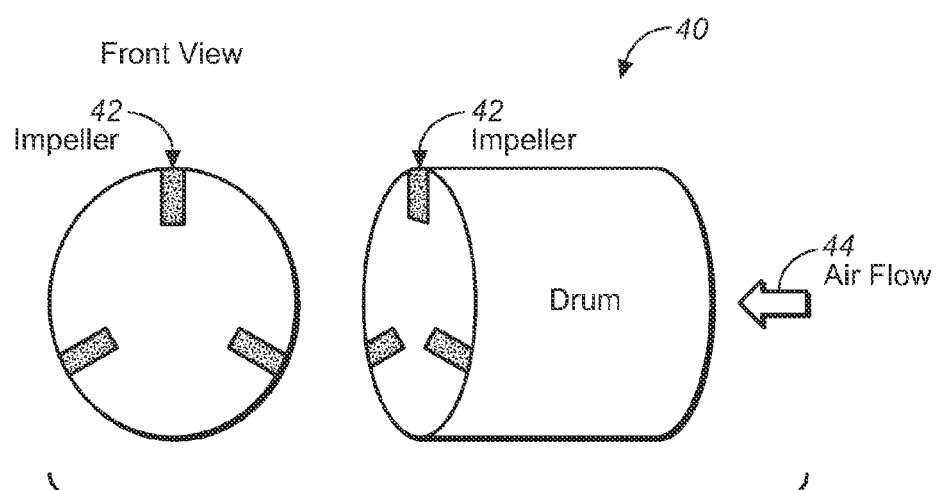
FIG. 2 shows a dielectric dryer drum of the present technology.

In an embodiment of the present technology, FIG. 2 shows a dielectric dryer drum 40 of the present technology in more details. The dielectric dryer drum 40 is similar to a conventional hot air dryer in drum construction and air flow. It includes open impellers 42 used to help tumble the clothes during the drying process. The open impeller comprises a series of vanes attached to a central hub for mounting on the shaft without any form of side wall or shroud. Impellors 42, and surface contact shapes (vanes), are designed to direct wet clothing into a centered & symmetrical position for various load types and weight.

Referring still to FIG. 1, in an embodiment of the present technology, DC power supply 12 is implemented by transforming standard AC 240 Volt (or AC 120 Volt) line Voltage.

Referring still to FIG. 1, in an embodiment of the present technology, the real time configurable RF Waveform power source 14 can be implemented by using 1 KW Class E Module PRF-1150 produced by IXYS. Please, see www.IXYS.com.

Referring still to FIG. 1, in an embodiment of the present technology, the RF Waveform power source 14 is configured by adjusting the gate drive generator impedance in real time based on both measured load characteristics and RF generator output current & voltage waveforms.

In an embodiment of the present technology, the RF & Physical sensors 18 of FIG. 1 are used to implement a real time RF power source that optimizes efficiency of the power transfer into the variable load. This process requires real-time sensors for a number of dynamic parameters, including: load impedance, load RF voltage magnitude and envelope wave shape, load RF current magnitude and envelope wave shape, phase of RF voltage vs. current (dynamic load factor), and load voltage standing wave ratio (VSWR) presented to the RF power source over the range of load variation.

Referring still to FIG. 1, in an embodiment of the present technology, RF & Physical sensors 18 are used to measure a number of parameters during the heating process including: (a) an impedance at least one RF frequency; (b) temperature variations of the load of clothing placed in the dryer drum; (c) moisture variations of the load of clothing placed in the dryer drum; (d) dimension variations of the dryer drum related to the movement of the anode plate (please, see discussion below); and (e) weight variations of the load of clothing.

In an embodiment of the present technology, RF & Physical sensors 18 include a non-contact thermal imaging temperature sensor that is based on the measuring thermal emission of radiation.

In an embodiment of the present technology, RF & Physical sensors 18 includes a non-contact moisture sensor, and sensors configured to measure dimension variations of the dryer drum related to the movement of the anode plate (please, see discussion below), and weight variations of the load of clothing.

In an embodiment of the present technology, the RF & Physical sensors 18 can be implemented by using MCT 360 NIR Transmitter that is a multiple constituent sensor configured to monitor moisture, load weight, load thickness, etc. from the same transmitter, continuously over the dynamic drying cycle.

In an embodiment of the present technology, the RF & Physical sensors 18 includes an RF impedance sensor that can be implemented by using Agilent E4991A RF Impedance/Spectrum Analyzer that can measure RF impedance in the wide range (1 MHz-3 GHz). The Agilent E4991A RF Impedance/Spectrum Analyzer derives the Impedance of a device under test (DUT) from measured voltage and current values.

Referring still to FIG. 1, in an embodiment of the present technology, the system controller & signal processor 16 can be implemented by using Altera® FPGAs. More specifically, Nios® II embedded processor can be used to create a microprocessor-based system that is customized to enable automation and control of the heating drying process of the present technology.

Referring still to FIG. 1, in an embodiment of the present technology, the system controller & signal processor 16 implements a dryer control system, by enabling the following functions: (a) collecting data inputs from all above described sensors; (b) providing real-time optimized DC supply voltage; (c) implementing load inductor pre-positioning; (d) adjusting output device gate voltage waveform and gate driver source impedance; and (e) implementing appropriate adjustment of the drying process depending on the load type, size, water content, user settings of cloth types, and desired level of final dryness.

Referring still to FIG. 1, in an embodiment of the present technology, the system controller & signal processor 16 provides hosting for all system data processing and provides an external data port for system diagnostics and maintenance.

Referring still to FIG. 1, in an embodiment of the present technology, the system controller & signal processor 16 utilizes user inputs for clothing type (delicate, cotton, etc.) and desired level of dryness to optimally control the drying process.

The apparatus 10 (of FIG. 1) comprises a high efficiency, solid-state, energy source/mechanical arrangement RF dielectric heating system for water (or other liquids) drying applications. The key concept is providing heat directly to the liquid in a load object that was previously (in the prior art) heated with hot air for evaporative drying. Heating the water directly is much more efficient process than heating the air used for evaporation. For example, the apparatus 10 (of FIG. 1) comprises an electric clothes dryer.

The apparatus 10 (of FIG. 1) is configured to convert electrical power into heat in a new and completely unique way. If the apparatus 10 (of FIG. 1) is applied to use in electric clothes drying, it results in drying a typical load of clothes with less than 50% energy, more than twice as fast, and at least half of the temperature rise as compared with prior art conventional dryers. Please, see discussion below.

As opposed to high frequency microwave cavity oven that concentrates heat only on the surface of an object being heated due to very short wavelengths used, the apparatus 10 (of FIG. 1) of the present technology is configured to use RF radiation that heats the volume of the load of clothing thus removing the moisture from the load in a more efficient manner.

Example I

For instance, the RF is in the range of 1-250 MHz.

Figure 3:
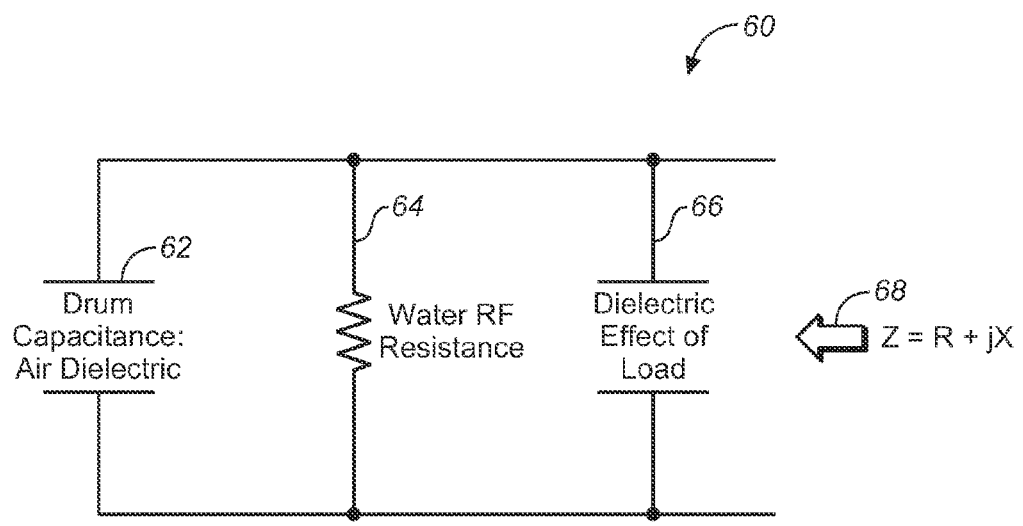
FIG. 3 depicts a dielectric load model of the apparatus of the present technology for efficient drying a load of clothing.

In an embodiment of the present technology, the RF electrical model of the apparatus 10 (of FIG. 1) for efficient drying a load of clothing is reduced to a dielectric load model 60 as depicted in FIG. 3. The drum has a fundamental capacitance, 62 based on its physical dimensions and air dielectric permittivity. The water in the load has an RF resistance 64 related to the amount of water contained. The materials in the load add an additional capacitance 66 to the model, based on their dielectric constant>1. Thus, the net impedance 68 of the load is:

$$Z = R + jX \tag{Eq. 1}$$

Figure 4:
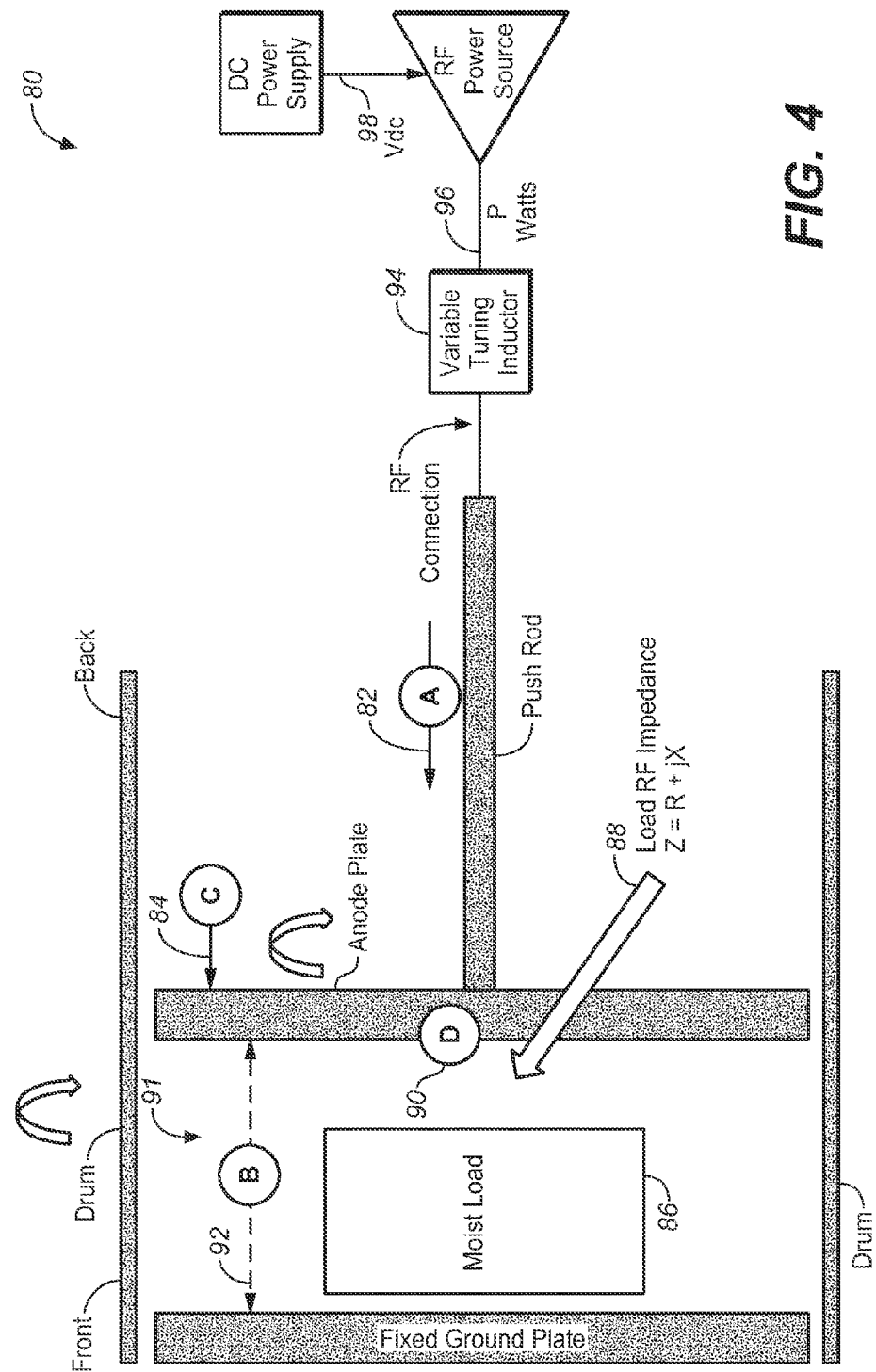
FIG. 4 illustrates basic dielectric heater concept of the apparatus of the present technology for efficient drying a load of clothing.

In an embodiment of the present technology, the basic dielectric heater concept 80 of the apparatus 10 (of FIG. 1) is illustrated in FIG. 4. The push rod A 82 moves the anode plate C 84 toward the moist load 86 to optimize the RF load resistance R 88 (please, see Eq. 1) at the RF feed point D 90.

The spacing distance B 92 has the minimum width consistent with the softness compressibility of the load materials. The variable tuning inductor 94 adjusts its value to tune out the +jX (please, see Eq. 1) of the load 86, thus yielding a pure resistive load, R (please, see Eq. 1) at feed point D 90.

In an embodiment of the present technology, referring still to FIG. 4, RF power P 96 is applied, proportionate to the amount of heating required by the load. The level of RF power P 96 is adjusted by setting the level of DC voltage Vdc 98 to a proper level for the given load resistance R (please, see Eq. 1).

Example II

1 KW of power will heat 717 g of water 20 deg C. in 1 minute.

In an embodiment of the present technology, referring still to FIG. 4, the drying process consists of alternating cycles, wherein each cycle comprises the following steps: (a) RF dielectric heating the load 86 in a fixed, non-rotating position where the anode plate C 84 is adjacent to the load; (b) moving the anode plate C 84 back to allow tumbled air drying of the heated load 86; (c) moving the anode plate C 84 forward towards the load 86; and (d) repeating the steps (a)-(c). In this embodiment, anode plate C 84 in the dryer drum 91 moves close to the clothes load 86 to minimize parasitic air/load capacitance jX→0 and to optimize the resistive (real) R component of the load 86.

In an embodiment of the present technology, referring still to FIG. 4, the drying process comprises RF dielectric heating of a rotating, tumbling load 86.

Figure 5:
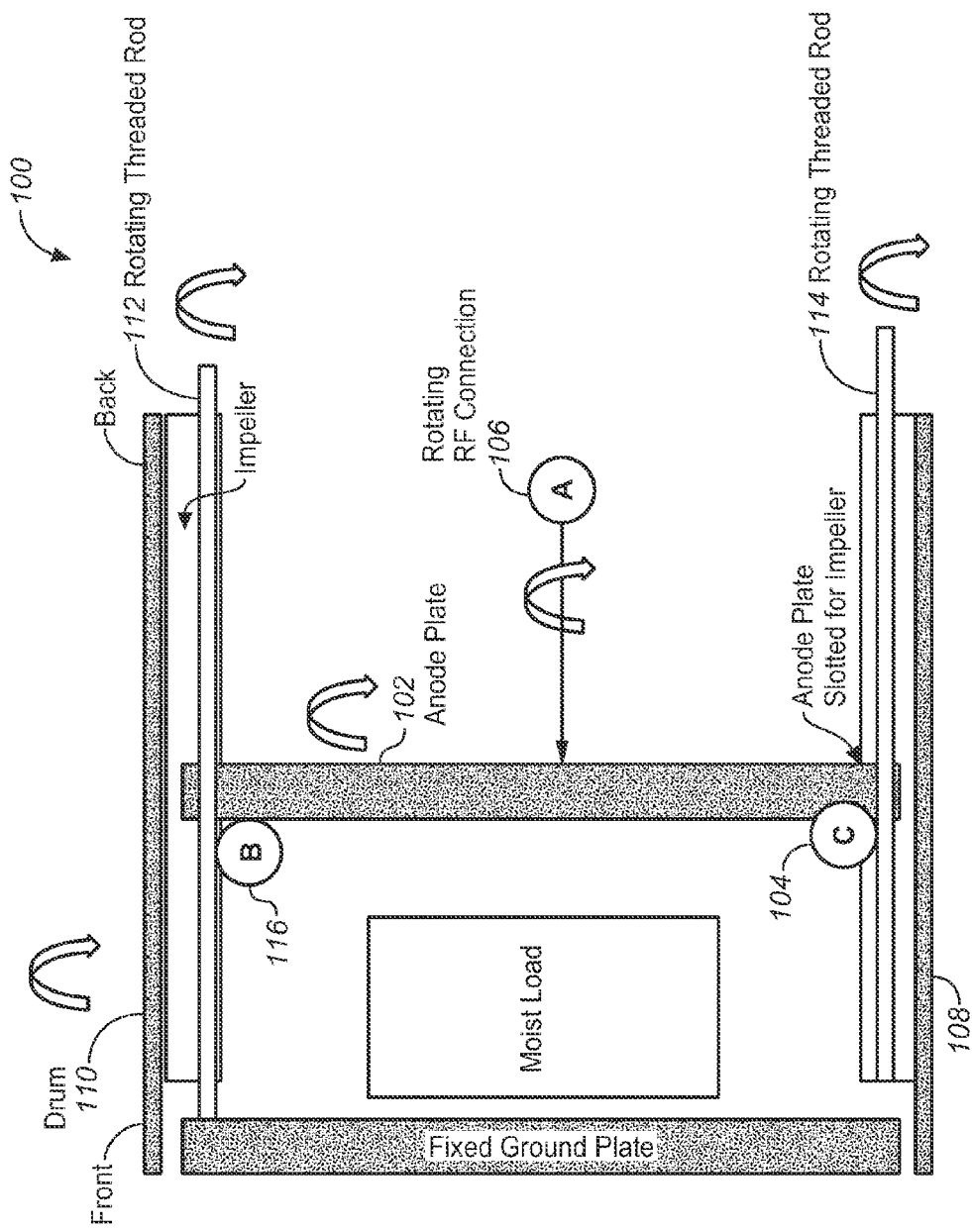
FIG. 5 shows threaded rod anode plate mechanical driver of the apparatus of the present technology for efficient drying a load of clothing.

In an embodiment of the present technology, FIG. 5 shows threaded rod anode plate mechanical driver 100 of the apparatus 10 (of FIG. 1) of the present technology for efficient drying a load of clothing.

In this embodiment of the present technology, the anode plate 102 is a single piece, slotted at C 104 to allow movement over the impellers.

In this embodiment of the present technology, a rotating RF connection A 106 is used for receiving RF energy from a fixed, externally located RF power source (not shown). Rotating threaded rods 112 (and 114), connected to the mating threaded anode plate 102 at B 116 (and C 104) move the anode plate 102 forward and backward. Thus, the anode plate 102 rotates with the drum (108 & 110).

In one embodiment of the present technology, gear drives (not shown) derived from the rotating drum could be used to turn the rods 112 and 114.

In one embodiment of the present technology, separate motor(s) (not shown) could be used to turn the rods 112 and 114.

Figure 6:
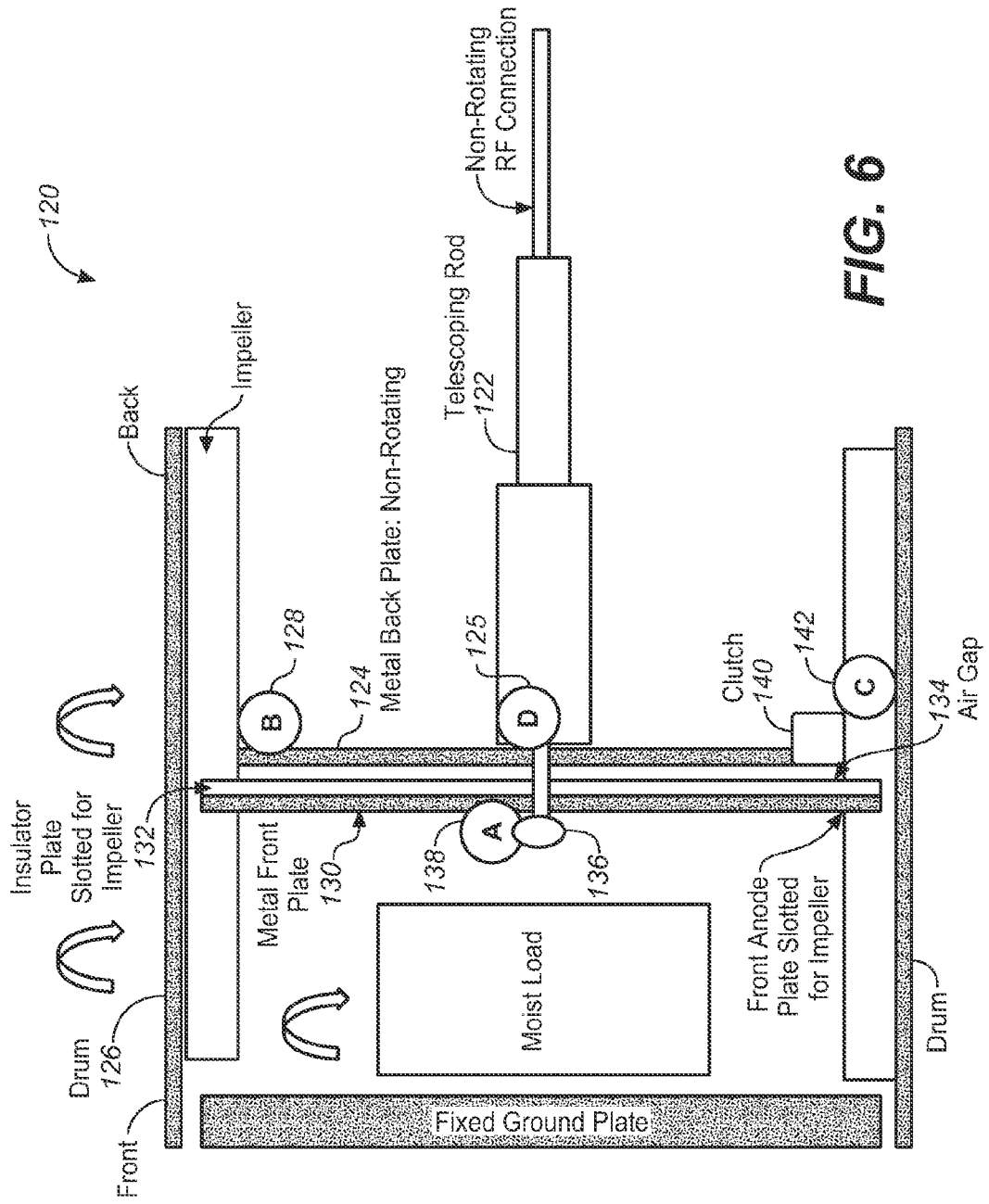
FIG. 6 depicts a complex anode plate mechanical driver including a non-rotating RF connection of the apparatus of the present technology for efficient drying a load of clothing.

In an embodiment of the present technology, FIG. 6 shows complex anode plate mechanical driver 120 of the apparatus 10 (of FIG. 1) of the present technology for efficient drying a load of clothing.

In this embodiment of the present technology, the RF power source (not shown) is connected to a non-rotating telescoping rod 122. The non-rotating telescoping rod 122 is attached to the back plate 124 at D 125. The non-rotating telescoping rod 122 provides a flexible RF connection from the RF power source (not shown) to point D 125.

In this embodiment of the present technology, the anode plate comprises a three piece structure. The first part of the anode plate is a metal back plate 124 which does not rotate with the drum 126. The diameter of metal back plate 124 is such that impellers can rotate at B 128 without interference.

In this embodiment of the present technology, the second part of the anode plate is a metal front plate 130 bonded with an insulator plate 132 (the third part of the anode plate), which rotates with the drum 126. Both the metal front plate 130 and the insulator plate 132 are slotted to allow movement over the impellers.

An air gap 134 between the rotating front plate 130 and fixed back plate 124 is provided. The air gap 134 should be sufficiently wide to ensure, with manufacturing tolerances, that no frictional contact exists between the rotating front plate 130 and the fixed back plate 124.

In one embodiment of the present technology, referring still to FIG. 6, a shaft bolt 136 is attached at A 138 to hold the anode plate assembly at a fixed overall thickness during front-back movement of the anode plate.

In one embodiment of the present technology, referring still to FIG. 6, a geared-periphery clutch ring 140 at C142 can be engaged to mesh with gear-edged impellers to move the anode plate.

Figure 7:
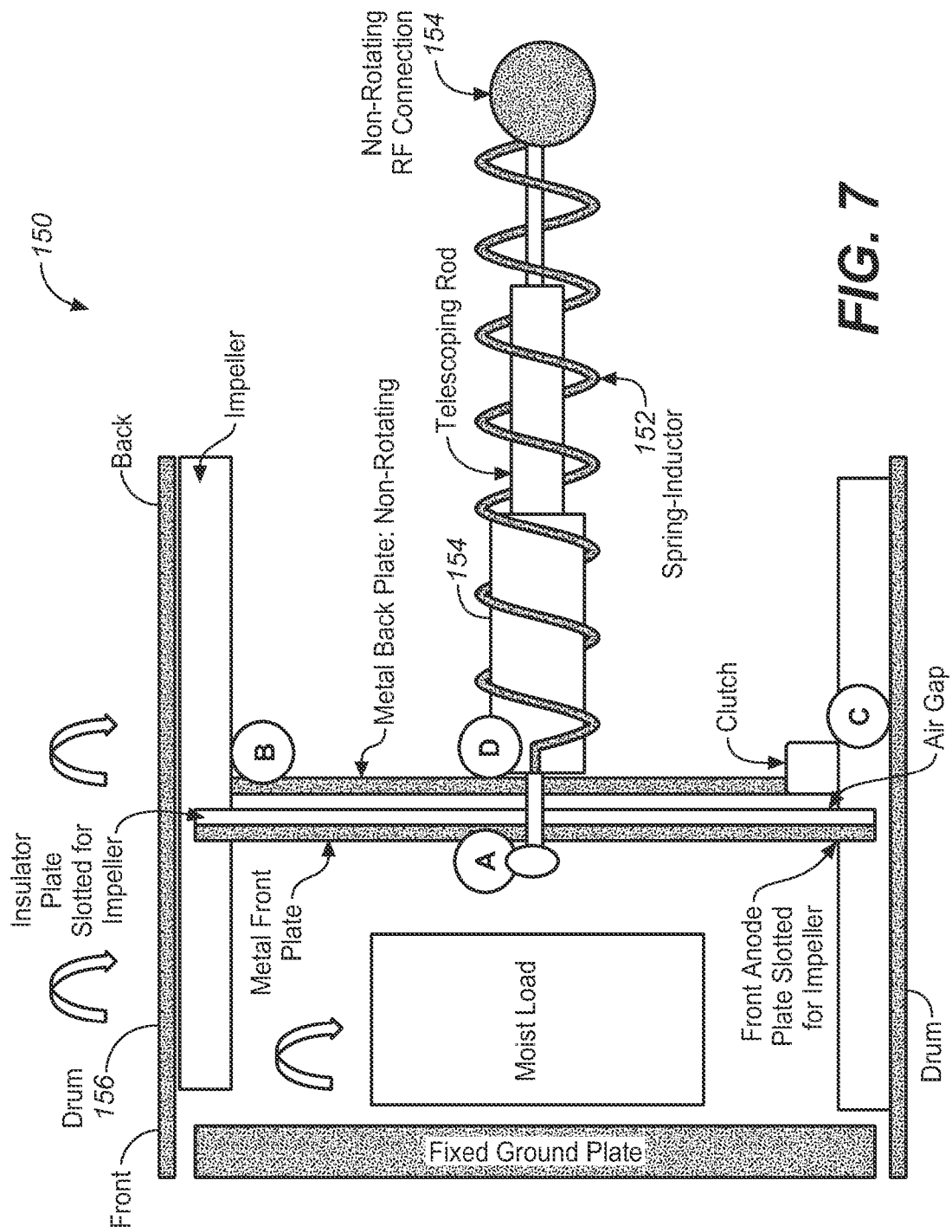
FIG. 7 illustrates a complex anode plate mechanical driver with spring inductor of the apparatus of the present technology for efficient drying a load of clothing.

In one embodiment of the present technology, FIG. 7 illustrates a complex anode plate mechanical driver with spring inductor 150 of the apparatus 10 (of FIG. 1) of the present technology for efficient drying a load of clothing.

A complex anode plate mechanical driver with spring inductor 150 of the apparatus 10 (of FIG. 1) of the present technology for efficient drying a load of clothing is substantially the same device as depicted on FIG. 6 complex anode plate mechanical driver 120 plus an additional element—a spring inductor 152 that connects the non-rotating telescoping rod 154 to a non-rotating RF connection 154.

In this embodiment of the present technology, the power transfer of the RF source to the drying load is optimized by using a spring-like RF variable tuning inductor 150 configured to minimize the reactive effect of the load of both the variable positions of the anode plate and the load dielectric effects.

In an embodiment of the present technology, referring still to FIG. 7, the reactance of the spring-like RF variable tuning inductor 150 is adjusted (minimized) by varying its length by using an electric motor or by gearing from the rotating drum 156.

In an embodiment of the present technology, referring still to FIG. 7, the position of the anode plate 156 is adjusted to optimize the real component R of the complex impedance load (please, see Eq. 1).

In an embodiment of the present technology, (not shown) electrical connections of RF power with all RF source electronics located outside the drum, in a fixed position to the rotating drum are implemented by a mechanically connected "rotating RF commutator".

In an embodiment of the present technology, electrical connections to the rotating drum are implemented by a capacitive rotating RF commutator, using concentric metal cylinders, separated by cylindrical spacers of dielectric insulating material (not shown).

In an embodiment of the present technology, a rotating mechanical DC commutator (slip ring) with RF source electronics is located as a module on the rotating drum (not shown).

In an embodiment of the present technology, data connection, for the sensors and control functions of the rotating module, is implemented by using a wireless modem such as IR.

In an embodiment of the present technology, the apparatus 10 of FIG. 1 provides an efficient RF dielectric heating system for drying applications by applying the RF heating energy directly to liquids for drying "wet" materials instead of the prior art drying process when the heating energy was applied to heat the air.

In an embodiment of the present technology, the apparatus 10 of FIG. 1 is further optimized by using an RF power source whose optimum load line is real time adaptable to the dielectrically heated load.

In an embodiment of the present technology, the apparatus 10 of FIG. 1 is further optimized by using a moving capacitive coupling plate for optimized RF power transfer.

In an embodiment of the present technology, the apparatus 10 of FIG. 1 is further optimized by using a tuning process, wherein a spring-like tunable inductor (no RF switching or sliding contacts) is used to tune out the capacitive reactance of the load. In addition, a variable DC voltage source is configured to implement the RF power transfer for the real (resistive) part of the load impedance.

In operation, the apparatus 10 of FIG. 1 implements the method for heating a medium (water) that includes an object having a variable weight (load of clothing) placed into a variable enclosure (a dryer drum having an anode plate). The load of clothing substantially absorbs water in a first "cool" state, and is substantially free from water in a second "heated" state.

In an embodiment of the present technology, the method for drying a load of clothing (not shown) comprises the following steps: adjusting dimensions of anode plate to optimize the heating process; adjusting the parameters of variable AC electrical field to optimize the heating process; and controlling the heating process, wherein the heating process is completed when the load of clothing is substantially dry (transferred into a "heated" state).

In an embodiment of the present technology, the method for drying a load of clothing (not shown) further comprises the step of using at least one electromechanically driven push rod (82 of FIG. 4) to both move and support the anode plate (84 of FIG. 4).

In an embodiment of the present technology, the method for drying a load of clothing (not shown) further comprises the step of using at least one push rod (82 of FIG. 4) to move the anode plate (84 of FIG. 4) toward the moisture load (86 of FIG. 4) to minimize an RF load resistance (88 of FIG. 4) at an RF feed point (90 of FIG. 4).

In an embodiment of the present technology, the method for drying a load of clothing (not shown) further comprises the step of using at least one push rod (82 of FIG. 4) to move the anode plate (84 of FIG. 4) toward the moisture load (86 of FIG. 4) wherein a variable tuning inductor (94 of FIG. 4) is configured to tune out reactance of the load (92 of FIG. 4) resulting in the load having a substantially real value resistance R.

In an embodiment of the present technology, the method for drying a load of clothing (not shown) further comprises the step of rotating the drum (91 of FIG. 4) in two directions, wherein the first rotation of the drum (91 of FIG. 4) is configured to move the anode plate (84 of FIG. 4) into the load (86 of FIG. 4) for dielectric heating, and wherein the second rotation of the drum (91 of FIG. 4) is configured to allow space for air flow to remove moisture from the heated clothes load (86 of FIG. 4).

In an embodiment of the present technology, the method for drying a load of clothing (not shown) further comprises the step of optimally configuring the shape and capacity of the dryer drum (91 of FIG. 4) internal dimensions (92 of FIG. 4) in both fixed and variable ways to accommodate for different kind of fabrics and different kind of load (86 of FIG. 4).

In an embodiment of the present technology, the method for drying a load of clothing (not shown) further comprises the step of pre-heating the air inside the dryer drum (91 of FIG. 4) for better water evaporation from the load of clothing (86 of FIG. 4).

In an embodiment of the present technology, the method for drying a load of clothing (not shown) further comprises the step of optimizing the heating process by using a tuning inductor (94 of FIG. 4).

In an embodiment of the present technology, tuning inductor (94 of FIG. 4) is selected from the group consisting of: a variable spring-like RF tuning inductor; a variable ferrite core tuning inductor; and a roller coil tuning inductor.

In an embodiment of the present technology, the method for drying a load of clothing (not shown) further comprises the step of optimizing the heating process by adjusting the input drive generator impedance, voltage waveform and duty cycles to the RF output devices in real-time, based on both measured load characteristics and RF generator output current & voltage waveforms.

In an embodiment of the present technology, the method for drying a load of clothing (not shown) further comprises the step of using a dryer control system (16 of FIG. 1) to control the heating process.

In an embodiment of the present technology, the step of using a dryer control system (16 of FIG. 1) to control the heating process further comprises the step of measuring temperature and power load to calculate the moisture context.

In an embodiment of the present technology, the step of using a dryer control system (16 of FIG. 1) to control the heating process further comprises the step of calculating the drying time.

In an embodiment of the present technology, if the apparatus 10 is used in a drying facility for commercial operations, the step of using a dryer control system (16 of FIG. 1) to control the heating process further comprises the step of scheduling the completion of the drying process to optimize commercial operations.

In an embodiment of the present technology, wherein the system controller and signal processor 16 of FIG. 1 further includes the Internet access via a wireless access (for example, via Wi-Fi), the step of using a dryer control system (16 of FIG. 1) to control the heating process further comprises the step of sending (or posting) a message on the Internet when the drying process is over.

TABLE I

Caldo Prototype Test Results for Cotton Towels

| Dryer Type | kWh per lb Water Removed | % Energy Reduction | Time to Dry | Maximum temperature |
|---|---|---|---|---|
| Standard Hot Air | 1.263 kWh/lb | 0 | 80 min | 112 deg F. |
| Caldo RF Heater | 0.567 kWh/lb | 55% | 40 min | 72 deg F. |

II. Apparatus for Efficient Heating Medium that Includes Object Having a Variable Weight.

Figure 8:
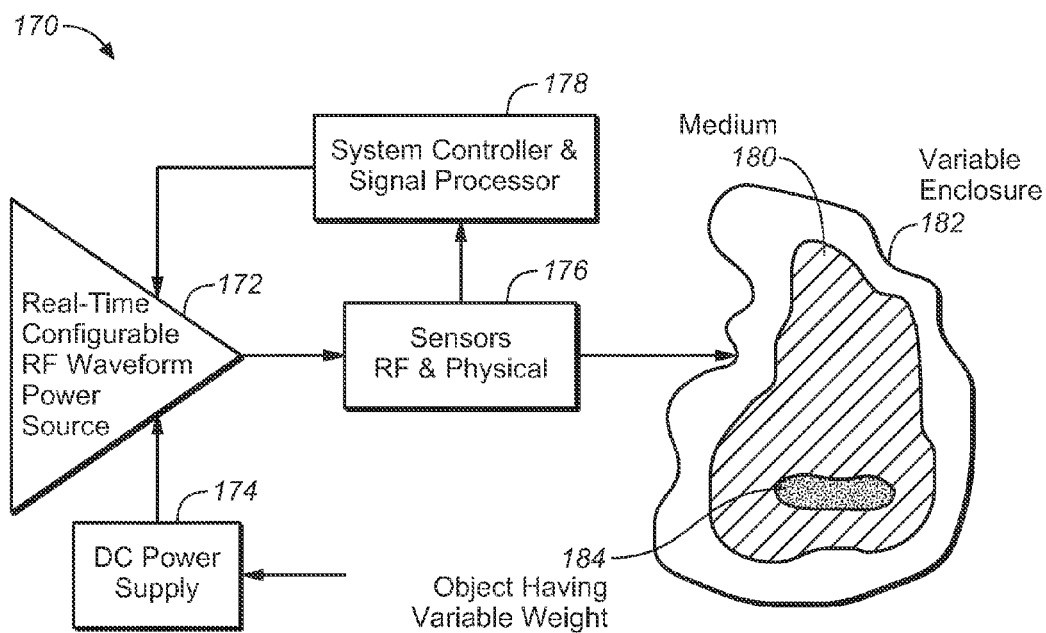
FIG. 8 shows an apparatus of the present technology for efficient heating medium.

FIG. 8 shows an apparatus 170 of the present technology for efficient heating medium 180 including an object 184 having a variable weight. The apparatus 170 comprises: a DC power supply 174, a real time configurable RF Waveform power source 172, a system controller & signal processor 178, a plurality of RF & Physical sensors 176, and a variable enclosure 182 including medium 180 and an object having a variable weight.

Referring still to FIG. 8, in an embodiment of the present technology, medium 180 is selected from the group consisting of: water; and liquid having a dielectric permittivity above a first predetermined threshold, and having a dissipation factor above a second predetermined threshold.

Example III

Medium 180 comprises petroleum.

Example IV

Medium 180 comprises synthetic oil.

Referring still to FIG. 8, in an embodiment of the present technology, an object 184 is selected from the group consisting of: a food substance; a wood substance; a plastic substance; and a chemical substance.

Example V

If object 184 comprises a food substance, the apparatus 180 of FIG. 8 can be used for preparation of dry food, like dry milk, etc.

Referring still to FIG. 8, in an embodiment of the present technology, the variable enclosure 182 is selected from the group consisting of: an enclosure having a variable thickness; an enclosure having a variable surface; and an enclosure having variable volume.

III. Apparatus for Heating a Medium Contained in a Variable Enclosure Having Adjustable Dimensions.

The apparatus 170 of FIG. 8 can be also used for efficient heating medium contained in a variable enclosure having adjustable dimensions.

Oil sands, also known as tar sands, or extra heavy oil, are a type of bitumen deposit. The sands are naturally occurring mixtures of sand or clay, water and an extremely dense and viscous form of petroleum called bitumen. They are found in large amounts in many countries throughout the world, but are found in extremely large quantities in Canada and Venezuela.

Oil sands reserves have only recently been considered to be part of the world's oil reserves, as higher oil prices and new technology enable them to be profitably extracted and upgraded to usable products. Oil sands are often referred to as unconventional oil or crude bitumen, in order to distinguish the bitumen extracted from oil sands from the free-flowing hydrocarbon mixtures known as crude oil traditionally produced from oil wells.

Making liquid fuels from oil sands require energy for steam injection and refining. This process generates two to four times the amount of greenhouse gases per barrel of final product as the production of conventional oil. If combustion of the final products is included, the so-called "Well to Wheels" approach, oil sands extraction, upgrade and use emits 10 to 45% more greenhouse gases than conventional crude.

Example VI

If medium includes tar sands, the apparatus 170 can be used for energy efficient extraction oil from tar sands with far less production of green house gasses effect due to less energy consumption required for this process as compared to the prior art methods.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for providing self-regulating capacitive electro-heating, said method comprising:
    (A) applying a single RF frequency Waveform power source to a capacitor coupled to said RF frequency Waveform power source, said capacitor including a variable enclosure; wherein a medium including an object having a variable weight is present in said variable enclosure and the single RF frequency is a frequency between 1 MHz and 250 MHz;
    (B) adjusting dimensions of said variable enclosure to maximize electric field capacitive coupling to the object and minimize capacitive coupling to empty space;
    (C) measuring an impedance of said variable enclosure including said object having variable weight; and
    (D) adjusting parameters of said RF frequency Waveform power source based on said measured impedance of said variable enclosure including said object having variable weight.

2. The method of claim 1, wherein said step (A) further comprises:
    (A1) selecting said object from the group consisting of:
    a cloth substance; a food substance; a wood substance; a plastic substance; and a chemical substance.

3. The method of claim 1, wherein said step (A) further comprises:
    (A2) selecting said medium from the group consisting of: water; liquid having a dielectric permittivity above a first predetermined threshold, and liquid having a dissipation factor above a second predetermined threshold.

4. The method of claim 1, wherein said step (A) further comprises:
    (A3) selecting said variable enclosure from the group consisting of: a drum having a variable thickness; a drum having a variable surface; a drum having a variable volume; an enclosure having a variable thickness; an enclosure having a variable surface; and an enclosure having variable volume.

5. The method of claim 1; wherein said variable enclosure comprises a dryer drum having an anode plate; and wherein said object comprises a load of clothing; and wherein said medium comprises water; and
wherein said step (B) further comprises:
(B1) using at least one side mounted rotating threaded rod to both move and support said anode plate.

6. The method of claim 1, wherein said variable enclosure comprises a dryer drum having an anode plate; and wherein said object comprises a load of clothing; and wherein said medium comprises water; and wherein said step (B) further comprises:
(B2) using at least one push rod to both move and support said anode plate.

7. The method of claim 1, wherein said variable enclosure comprises a dryer drum having an anode plate; and wherein said object comprises a load of clothing; and wherein said medium comprises water; and wherein said step (B) further comprises;
(B3) using at least one electromechanically driven push rod to both move and support said anode plate.

8. The method of claim 7, wherein said variable enclosure comprises a dryer drum having an anode plate; and Wherein said object comprises a load of clothing; and wherein said medium comprises water; and wherein said step (B3) further comprises:
(B3, 1) using at least one push rod to move said anode plate toward said load to minimize an RF load resistance at an RF feed point; wherein a spacing distance between said anode plate and a fixed ground plate comprises a minimum width consistent with size and softness of said load materials.

9. The method of claim 7, wherein said variable enclosure comprises a dryer drum having an anode plate; and wherein said object comprises a load of clothing; and wherein said medium comprises water; and wherein said step (B3) further comprises:
(B3, 2) using at least one push rod to move said anode plate toward said load, wherein a variable tuning inductor is configured to tune out a reactance of said load resulting in said load having a substantially real value resistance.

10. The method of claim 1, wherein said step (C) further comprises:
(C1) measuring a set of parameters affecting said impedance of said object at at least one RF frequency, said set of parameters selected from the group consisting of:
temperature variations of said object within said variable enclosure; moisture variations of said object within said variable enclosure; dimension variations of said enclosure; and weight variations of said object.

11. The method of claim 10; wherein said step (C1) further comprises:
(C1, 1) rotating said variable enclosure to optimize said set of parameters; wherein said optimized set of parameters results in optimization of said capacitive electro-heating process.

12. The method of claim 10, wherein said variable enclosure comprises a dryer drum having an anode plate, and wherein said object comprises a load of clothing; and wherein said medium comprises water; and wherein said step (C1) further comprises:
(C1, 2) rotating said drum, wherein a first rotation of said drum is configured to move said anode plate into said load for dielectric heating, and wherein a second rotation of said drum is configured to allow space for air flow to remove moisture from said heated clothes load.

13. The method of claim 1, wherein said step (D) further comprises:
(D1) selecting parameters of said single RF frequency Waveform power source from the group consisting of:
an applied RF voltage magnitude and envelope wave shape; an applied RF current magnitude and envelope wave shape; phase of RF voltage vs. current; voltage standing wave ratio (VSWR); and a single RF frequency.

14. The method of claim 1, wherein said step (D) further comprises
(D2) applying variable RF power to optimize said capacitive electro-heating process.

15. The method of claim 14, wherein said variable enclosure comprises a dryer drum having an anode plate, and wherein said object comprises a load of clothing; wherein said step (D2) further comprises:
(D2, 1) adjusting a level of said variable applied RF power based on said measured load resistance.

16. The method of claim 1, wherein said variable enclosure comprises a dryer drum having an anode plate, and wherein said object comprises a load of clothing; and wherein said medium comprises water; further comprising:
(E) pre-heating the air inside said dryer drum for better water evaporation from said load of clothing.

17. The method of claim 1, wherein said variable enclosure comprises a dryer drum having an anode plate, and wherein said object comprises a load of clothing; and wherein said medium comprises water; further comprising:
(F) optimizing said self-regulating capacitive electro-heating process by using a tuning inductor; wherein said tuning inductor is selected from the group consisting of:
a variable spring-like RF tuning inductor; a variable ferrite core tuning inductor; and a roller coil tuning inductor.

18. Apparatus for providing self-regulating capacitive electro-heating, said apparatus comprising:
(A) means for applying a single RF frequency Waveform power source to a capacitor coupled to said RF frequency Waveform power source, said capacitor including a variable enclosure; wherein a medium including an object having a variable weight is present in said variable enclosure and the single RF frequency is a frequency between 1 MHz and 250 MHz;
(B) means for adjusting dimensions of said variable enclosure to maximize electric field capacitive coupling to the object and minimize capacitive coupling to empty space;
(C) means for measuring an impedance of said object having variable weight; and
(D) means for adjusting parameters of said RF frequency Waveform power source based on said measured impedance of said object.

* * * * *